(12) United States Patent
Nishizawa et al.

(10) Patent No.: US 6,820,085 B2
(45) Date of Patent: Nov. 16, 2004

(54) WEB SYSTEM HAVING CLUSTERED APPLICATION SERVERS AND CLUSTERED DATABASES

(75) Inventors: Itaru Nishizawa, Koganei (JP); Nobutoshi Sagawa, Koganei (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 10/075,263

(22) Filed: Feb. 15, 2002

(65) Prior Publication Data

US 2002/0198883 A1 Dec. 26, 2002

(30) Foreign Application Priority Data

Jun. 26, 2001 (JP) ........................................ 2001-192189

(51) Int. Cl.[7] .............................................. G06F 17/30
(52) U.S. Cl. .................................. 707/10; 707/2; 707/8
(58) Field of Search ............................... 707/1–10, 100, 707/104.1; 709/203, 206, 218, 229; 713/200

(56) References Cited

U.S. PATENT DOCUMENTS

| | | | |
|---|---|---|---|
| 6,363,387 B1 * | 3/2002 | Ponnekanti et al. | 707/10 |
| 6,571,259 B1 * | 5/2003 | Zheng et al. | 707/205 |
| 6,738,775 B2 * | 5/2004 | Asherman | 707/10 |
| 2003/0023603 A1 * | 1/2003 | Ellison et al. | 707/10 |

FOREIGN PATENT DOCUMENTS

JP      11-149449      6/1999

OTHER PUBLICATIONS

Oracle 9i Application Server Database Cache, Nov. 2000 White Paper.
Principles of Database and Knowledge–Base Systems, vol. II, J.D. Ullman, Chapter 14, "Optimization for Conjunctive Queries", pp. 877–916.

* cited by examiner

*Primary Examiner*—Charles Rones
*Assistant Examiner*—Neveen Abel-Jalil
(74) *Attorney, Agent, or Firm*—Mattingly, Stanger & Malur, P.C.

(57) ABSTRACT

The present invention improves the scalability of application servers and database servers in Web systems, thereby providing higher cost-performance Web systems. The session state of an application is stored in a clustered cache database as required. This enables another application running on an arbitrary cluster server to read the stored session state from the clustered cache database to continue the processing of the application. In addition, a cache database cluster in which data can be updated on the cluster servers is configured, thereby providing a mechanism of causing them to synchronize with the database servers as necessary. Furthermore, a mechanism of adding cache databases to the cache database cluster, thereby enabling the system to respond to an increase in database access load.

15 Claims, 17 Drawing Sheets

FIG. 5

| # | DATABASE SERVER NAME 502 | DATABASE NAME 503 | TABLE NAME & ATTRIBUTE NAME 504 | PARTITION KEY 505 | CASHING TARGET DATA CONDITIONS 506 | CACHED DATA CONDITIONS 507 | REFRESH POLICY 508 | REFRESH UPDATABILITY 509 |
|---|---|---|---|---|---|---|---|---|
| 1 | DATABASE SERVER 1 | Customer | c_address(c_id, c_name, c_address, c_phone) | c_id | 1<=c_id<100000 | 1<=c_id<50000 | LRU | Yes |
| 2 | DATABASE SERVER 2 | Customer | c_account(c_id, c_accname, c_accid, c_balance) | c_id | 1<=c_id<100000 | 40000<=c_id<=80000 | FREQUENCY OF USE | Yes |
| 3 | DATABASE SERVER 0 | Account | bank_account (b_id, b_braid, b_name, b_balance) | b_id, b_braid | b_id={1,3} AND 1<=b_braid<100 | b_id=1 AND 1<=b_braid<100 | DEFINITION OF PRIORITY b_id=1 | No |
| ... | ... | ... | ... | ... | ... | ... | ... | ... |

FIG. 10

| # | CACHE DATABASE SERVER NAME 1002 | CACHE DATABASE NAME 1010 | NAME OF DATABASE IN DATABASE SERVER 1003 | TABLE NAME & ATTRIBUTE NAME 1004 | PARTITION KEY 1005 | CACHING TARGET DATA CONDITIONS 1006 | CACHED DATA CONDITIONS 1007 | UPDATA-BILITY 1008 | OPERATING STATE 1009 |
|---|---|---|---|---|---|---|---|---|---|
| 1 | CACHE DATABASE SERVER 1 | CACHE DATABASE 1 | Customer | c_address(c_id, c_name, c_adress, c_phone) | c_id | 1<=c_id <100000 | 1<=c_id <50000 | Yes | IN OPERATION |
| 2 | CACHE DATABASE SERVER 2 | CACHE DATABASE 2 | Customer | c_address(c_id, c_name, c_adress, c_phone) | c_id | 100001 <=c_id <200000 | 40000 <=c_id <=80000 | Yes | BLOCKED AND SYNCHRONIZED |
| 3 | CACHE DATABASE SERVER N | CACHE DATABASE 3 | Customer | c_address(c_id, c_name, c_adress, c_phone) | c_id | 200001 <=c_id <300000 | bitmap_01 | Yes | IN OPERATION |
| ... | ... | ... | ... | ... | ... | ... | ... | ... | ... |

FIG. 16

| SESSION ID 1602 | APPLICATION NAME 1603 | CHECK POINT 1604 | STORAGE TARGET VARIABLES AND THEIR VALUES 1605 |
|---|---|---|---|
| 10021 | customer_management | 15 | (c_id,10), (c_name,"Itaru Nishizawa"), ... |
| 22310 | employee_accounting | 12 | (e_id,10050), ... |
| 48365 | customer_management | 3 | ... |
| ... | ... | ... | ... |

FIG. 17

| APPLICATION NAME 1702 | TABLE NAME 1703 | PARTITION KEY 1704 | CACHING TARGET DATA CONDITIONS 1705 | CACHE DATABASE SERVER NAME 1706 | CACHE DATABASE NAME 1707 |
|---|---|---|---|---|---|
| customer_management | c_address (c_id, c_name, c_address, c_phone) | c_id | 1<=c_id<100000 | CACHE DATABASE SERVER 1 | CACHE DATABASE 2 |
| customer_management | c_address (c_id, c_name, c_address, c_phone) | c_id | 100001<=c_id<200000 | CACHE DATABASE SERVER 2 | CACHE DATABASE 2 |
| ... | ... | ... | ... | ... | ... |

FIG.18

SELECT c_name FROM c_address WHERE c_id=60000; ~1801

SELECT c_id, c_name, c_address, c_phone FROM c_address WHERE c_id=60000;
1802

WEB SYSTEM HAVING CLUSTERED APPLICATION SERVERS AND CLUSTERED DATABASES

BACKGROUND OF THE INVENTION

1. Field of the Invention

The present invention relates to a method of clustering application servers, a method of forming a cache database cluster that caches data of database servers, and a Web system configured thereby.

2. Description of the Related Art

World Wide Web (abbreviated as Web below) system configuration has raised a significant challenge of improving scalability in terms of provision of adequate performance in the large-scale configuration and improvement of the operability enabling flexible response to abrupt changes in system load. Especially, in recent years, large-scale EC sites where many users demand near real-time system responses and portal sites that dynamically generate customized pages for each user are increasingly being constructed. These systems will increase in the number of accesses to their databases than conventional systems, so the improvement of scalability is increasingly becoming a significant challenge.

Most conventional Web systems have the three-level hierarchical structure shown in FIG. 3, which includes a plurality of Web servers 304 and 305, an application server 307, and a database server 309. An exemplary Web system service session requested from clients will be described with reference to FIG. 3. One of client computers (referred to as clients below) 301 and 302 issues a request to one of the Web servers 304 and 305 through a network 303. On reception of the request, the applicable Web server among the Web servers 304 to 305 transfers the request to the application server 307 through a network 306. The application server 307 executes an application for processing the request to generate a result of the processing, and returned the result to the applicable Web server. The applicable Web server produces a Web page into which the processing result received from the application server 307 is inserted, then returns the produced Web page to the applicable client, whereby one session is ended. If the application needs access to a database 311 in the database server 309, the application server 307 accesses the database server 309 through a network 308, and obtain or update data in the database 311.

As shown in the system configuration in FIG. 3, many Web systems include clustered Web servers. In FIG. 3, for example, the Web system uses L clustered Web servers, Web server 1 (304) to Web server L (305). Web servers are clustered mainly for the purpose of providing scalability that enables response to increase in load such as increase in the number of clients. Web servers can be clustered easily because Hypertext Transfer Protocol (abbreviated as HTTP below) used for client-Web server communications uses a stateless protocol. That HTTP is a stateless protocol means that a session can be newly established for every Web client-server communication, so the session can be assigned to any Web server in a cluster. Specifically, response to increase in load including increase in the number of users, for example, by adding rack-mount thin-types of servers one by one as necessary to enhance the system becomes possible.

In contrast to Web servers, since applications have state information, application servers do not work well even if servers (hardware) are clustered. The reason will be described using an example. Suppose an environment in which a plurality of application servers execute the same application for load balancing. Web systems generally perform processing through interaction with the users. Suppose book purchase processing at a Web site. The user first (1) retrieves the applicable database for a desired book list, (2) selects a desired book from the retrieved book list, (3) inputs his address for delivery of the book, and finally (4) makes arrangement for its settlement by his credit card or another applicable means. If this logical session including the purchase processes (1) to (4) is implemented as one application, the application involves a client-Web browser session employing the HTTP protocol (referred to as Web sessions below) in each phase of the purchase processes (1) to (4).

When there is only one application server, even if Web servers are clustered and accordingly there are a plurality of clustered Web servers, the application server can resume the processing by storing the final state of the applicable logical session for the processes (1) to (4) therein. JP-A-149449/1999, for example, has disclosed a method in which a database server gives a session ID to a session when it performs processing and stores the final state of the processing therein, transfers the applicable session ID to the client if the processing must be resumed, and on reception of a request containing the session ID from the client, it resumes the processing from the stored final state. The method retains the final state of processing by stopping a thread executing the session and continues the processing by resuming execution of the thread in response to the request. Even with this method, however, it is difficult to switch over to another server for resuming execution of the application. The reason is that, if each Web session of the purchase processes (1) to (4) is assigned to a different Web server and the request is transferred from the Web server to an application server other than the application server that has previously performed the processing, the database server cannot obtain the final state of the previously performed logical session, and accordingly cannot resume the logical session from the final state.

For database servers, generally, one database management system provides centralized management on all data to maintain consistency of the data. Therefore, it was difficult to improve the scalability by clustering them as with application servers. The document Oracle 9i Application Server Database Cache has disclosed a method for improving performance of application servers. The method caches data in a database server into a Web server in table units, and uses the cached data as necessary to avoid the database server from being accessed, thereby reducing load on the database server to improve scalability. On occurrence of a request for an update process, however, this method cannot perform the processing by using the cached data, which raises the necessity for the database server to perform the processing in the end, degrading the performance. In addition, since tables in database servers are generally of much greater size, use of comparatively inexpensive cluster servers, which are generally used for Web servers, often makes caching of data in table units impossible.

For large-scale Web systems, it has been difficult to provide scalability, raising a problem that they cannot respond to increase in the number of the users and abrupt increase in the system load.

In addition, due to the difficulty of providing scalability, Web systems must use expensive higher multiplexed SMP servers for their application servers and database servers, which create bottlenecks for processing, to provide adequate performance, making its implementation impossible.

SUMMARY OF THE INVENTION

It is accordingly an object of the present invention to improve system scalability, thereby providing Web systems that can easily provide adequate performance regardless of scale required.

A specific object of the present invention is to provide a method for enabling application servers to be clustered.

Another specific object of the present invention is to provide a cache with clustered databases (referred to as a cache database cluster below).

A further specific object of the present invention is to provide a method of structuring higher cost-performance Web systems by using a cluster system instead of using expensive higher multiplexed SMP servers.

Typical structures according to the present invention for attaining these objects will be described below.

First, the present invention provides a system in which the logical session state of an application is stored in a clustered cache database as necessary and the stored logical session state is read from the clustered cache database as requested. Using this system makes it possible for the processing of an application to be continued by another application that runs on an arbitrary server among clustered servers, thus making it possible to cluster application servers. The present invention creates a cache database cluster updatable on the clustered servers, thereby reducing load on the database servers. The present invention provides a system causing the cache database servers to synchronize with the database servers. Cache databases in the cache database clusters can also cache tables partially, thereby implementing optimized caching according to the amount of storage available in the caches. This system can reduce the number of accesses to the database servers for update processing, thereby making it possible to improve the scalability of the database servers.

In addition to the method of clustering application servers and the method of configuring cache database clusters, the present invention provides an automated cache database addition mechanism for the cache database clusters. Using this system makes it possible to configure higher-cost-performance and higher-scalability cluster systems easily.

Use of the present invention makes it possible to cluster application servers and configure updatable cache database clusters, thereby providing higher scalability of Web systems. In addition, the present invention makes it possible to configure Web systems by using lower-price cluster servers instead of using expensive higher multiplexed SMP servers, thereby improving cost-performance of the systems.

BRIEF DESCRIPTION OF THE DRAWINGS

In the attached drawings:

FIG. 5 shows an exemplary stored data management table in the cache database server;

FIG. 10 shows an exemplary cache database management table in the database servers;

FIG. 16 shows an exemplary session management table in the cache database servers;

FIG. 17 shows an exemplary application-cache database mapping table in the application servers; and FIG. 18 shows exemplary expressions for converting a query to the one for servers.

DETAILED DESCRIPTION OF THE INVENTION

Figure 1:
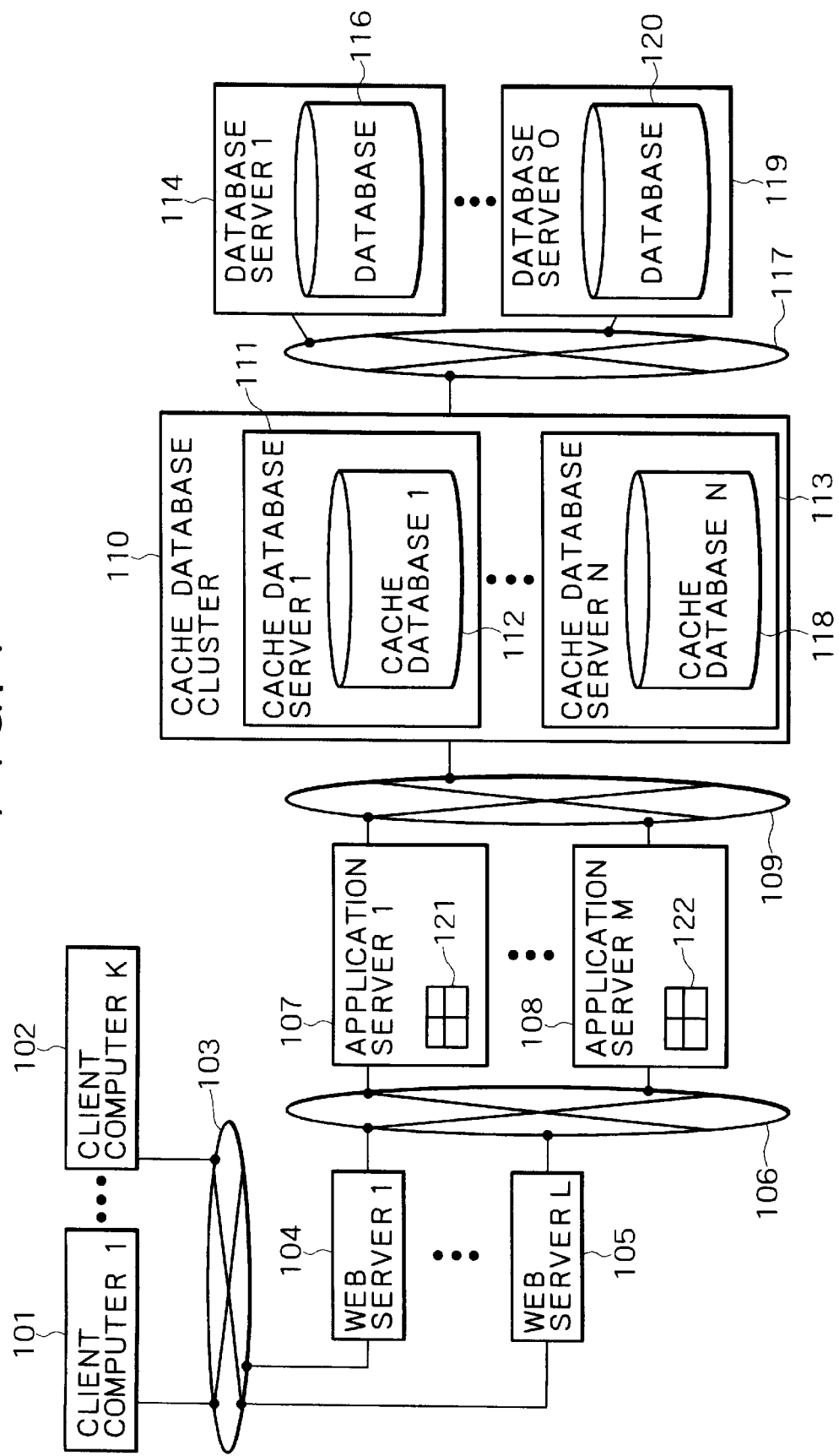
FIG. 1 is a drawing showing the structure of a Web system with clustered application servers and clustered database servers and a cache database cluster according to the present invention.

A preferable embodiment of a Web system according to the present invention will be described with reference to FIG. 1. In FIG. 1, client computers 1 (101) to K (102) are connected through a network 103 to Web servers 1 (104) to L (105). The Web servers 1 (104) to L (105) are further connected through a network 106 to application servers 1 (107) to M (108). The application servers 1 (107) to M (108) are also connected to a cache database cluster 110 through a network 109.

The cache database cluster includes a plurality of cache database servers. FIG. 1, for example, shows the cache database cluster 110 with N cache database servers in total, cache database servers 1 (111) to N (113). The cache database servers 1 (111) to N (113) include cache databases 1 (112) to N (118) respectively. The internal structures of the cache database servers will be described later.

The cache database cluster 110 is also connected to database servers 1 (114) to O (120) through a network 117. The database servers 1 (114) to O (120) include databases 116 to 120 that manage original data, respectively. The internal structures of the database servers 1 (114) to O (120) will also be described later.

The networks 103, 106, 109, and 117 may be Ethernets, local area networks (LANs) using optical fibers or other applicable lines, or wide area networks (WANs) including the Internet that operates slower than LANs. The client computers may be personal computers such as Hitachi's FLORA, computer systems such as Hitachi's 9000V workstation series J6000, hand-held terminals such as Hitachi's Persona, or cellular phones equipped with query interfaces. The Web servers, application servers, and cache database servers may be arbitrary workstations such as Hitachi's 9000V workstation series J6000 or space-saving low-end servers such as Hitachi's 9000V A500. The database servers may be Hitachi's 9000V high-end server VT850 or mid-range server N4000.

Regarding a Web system having the structure shown in FIG. 1, (1) a method of clustering the application servers and (2) a method of structuring the cache database cluster and the usage thereof will now be described. The description of the method (2) will be given further by including (i) a query processing method using the cache database cluster, (ii) a transaction processing method in the database servers, and (iii) a cache database addition processing method in this order and with their examples.

In Web systems, the users generally use dedicated programs that operate on client computers or Web browsers such as Microsoft's Internet Explorer and Netscape's Netscape Communicator to issue queries to the systems, and obtain the query-results. Therefore, strictly speaking, the issuers of queries and the obtainers of the final results are the users concerned, but the following description will assume the issuers of queries and the obtainers of the final results to be the client computers for simplicity. This simplification exerts no influence upon the substance of the present invention.

First the method of clustering application servers will be described. In the preferable embodiment of the present invention, as shown in FIG. 1, queries issued by the clients are received by the Web servers and transferred to the application servers that execute applications needed for the processing. As in the description of the prior art, since an application usually retains state information, if the processing is assigned to another application running on an arbitrary application server, the other application cannot continue the processing, making it difficult to cluster application servers in Web systems. This embodiment provides a system in which a logical session state is stored in one of the cache databases 1 (112) to N (118) in the cache database cluster 110, and applications read the stored logical session state therefrom, thereby making it possible for the processing to be continued by an application running on an arbitrary application server. A method of storing application states in cache databases and logical session continuation processing using the stored states will be described in detail.

Figure 14:
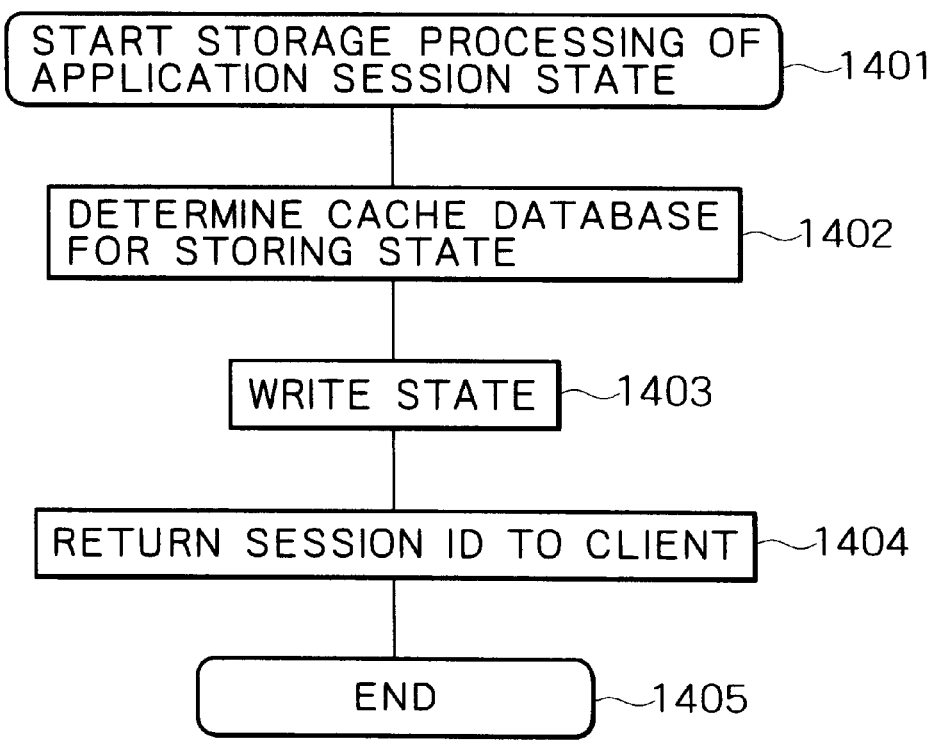
FIG. 14 is a flowchart showing a series of application session state storage processing steps.

The logical session state storage processing performed by an application running on the application server 1 (107) will be described. FIG. 14 is a flowchart showing the processing steps. First the application decides a cache database in which it will store the state, as necessary (step 1402). The cache database can be decided, for example, just by adopting a hash function to a session ID that becomes a unique value in the system. The session ID that becomes a unique value in the system can be generated, for example, by concatenating a Web server's specific ID to the unique ID generated in the Web server.

As described with the example of a book purchase session, a logical session includes a plurality of HTTP sessions. A clustered Web server can give a unique session ID to each of the logical sessions in the following two methods. (1) If a request from a client does not contain any session ID, the Web server generates a unique ID mentioned above and returns the value together with the session ID to perform an HTTP session with the client halfway through the logical session. (2) If a request from a client contains a session ID, the Web server uses the session ID.

After the cache database into which the state will be stored is decided, the state of the application is written into the cache database (step 1403). The state read and write operations in the cache database are carried out by a session management unit 207 in the cache database server 1 (111) shown in FIG. 2, and written data is retained in a session management table 222. The session management table 222 may be retained in a database table in the cache database 1 (112) or in memory or a file on the cache database server 1 (111).

FIG. 16 shows an example of the session management table 222. This table retains information including session IDs, names of applications to be continued, the check points, and variables and sets of their values used for continuing the processing. For a logical session with session ID 10021, for example, its application name is customer_management, the check point showing the progress is 15, the variables to be stored at the checkpoint are c_id and c_name, and their values are 10 and "Itaru Nishizawa" respectively. After the state is written into the cache database, the application returns the current session ID to the client (step 1404), and terminates the logical session state storage process (step 1405).

Figure 15:
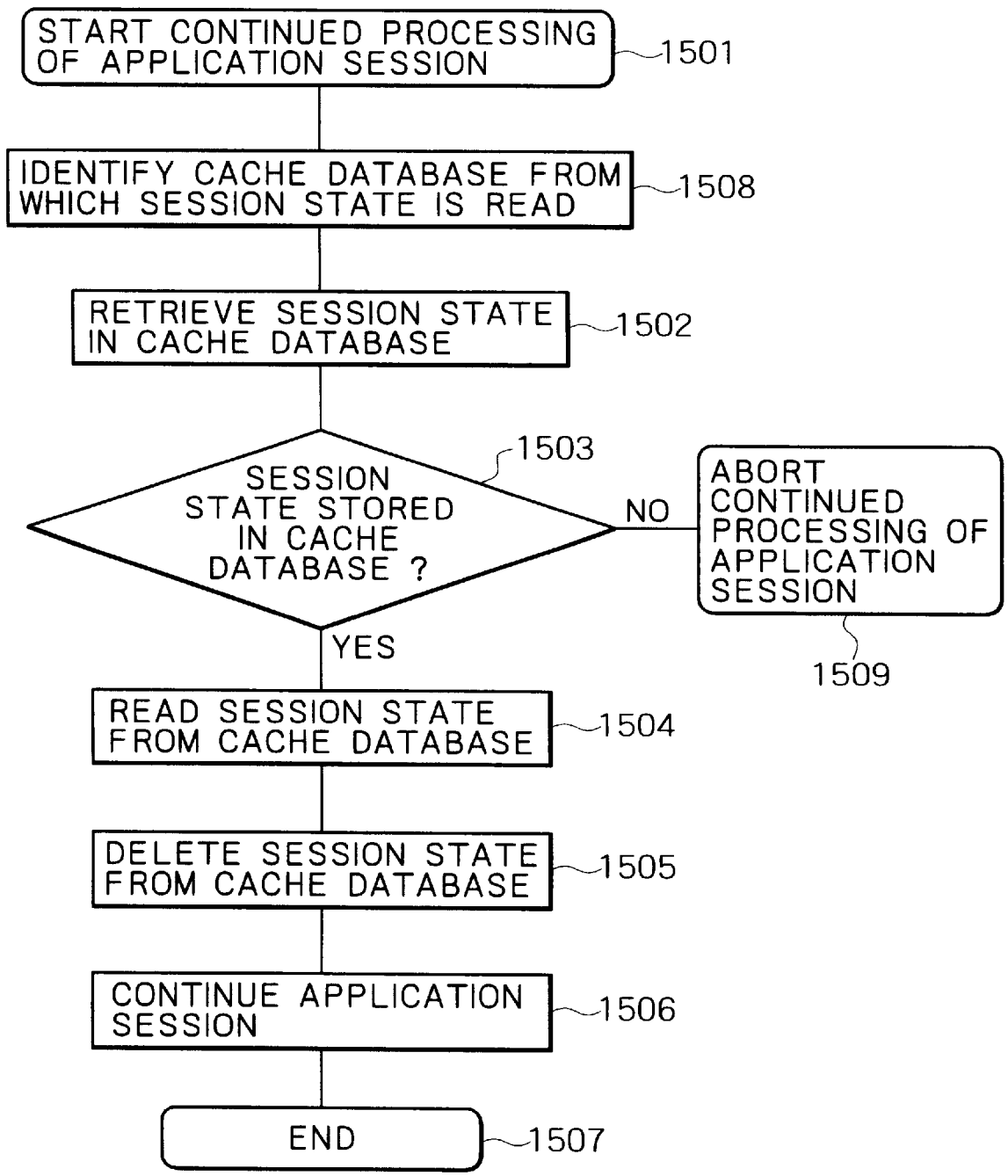
FIG. 15 is a flowchart showing a series of application session continuation processing steps.

Next, a method of continue the processing of an application by using the logical session state stored in the cache database will be described with reference to the flowchart shown in FIG. 15. When the application server receives a request from the Web server, it checks the request for the session ID. If the request contains the session ID, the application server identifies a target cache database by using the session ID in the same way as in the case of writing the logical session state thereinto (step 1508), and searches the cache database for the logical session state (step 1502). If the logical session state is not found in the cache database (if 'No' is selected in step 1503), the continuation process is aborted (step 1509). If the logical session state is found in the cache database (if 'Yes' is selected in step 1503), the application server reads the logical session state from the cache database (step 1504). Suppose session ID 10021 is designated, for example, searching the session management table 222 shown in FIG. 16 makes it apparent that the application customer_management has been suspended at check point 15 and that the correspondences between the variables and their values at the check point are c_id=10 and c_name="Itaru Nishizawa". After reading out of the state, the application server deletes the logical session state from the cache database (step 1505), then continues the application session (logical session) by using the state that has been read (1506).

Up to this point, the application processing continuation process using mechanisms of storing an application state into a cache database and reading the stored data therefrom has been described. The method makes it possible to cluster application servers, thereby improving the scalability of the application servers.

A method of configuring a cache database cluster to improve the scalability of the database servers and the usage of the same will now be described.

First a query processing method using the cache database cluster will be described. As described above, each cache database in a cache database cluster caches data when applications access the database servers, thereby reducing the number of accesses to the database servers for improved scalability of the entire system.

In a Web system with the structure shown in FIG. 1, the application server accesses the cache database cluster 110 to obtain its desired data. The application can determine a cache database to access in the cache database cluster 110, for example, by retaining an application-cache database mapping table that describes a correlation between data used by the application and a cache database storing the data, as the application-cache database tables 121 and 122 shown in FIG. 17, in the application server and referencing the table. Referencing the table shown in FIG. 17 makes it apparent that data of c_id=100 in the table c_address which the application customer_management references can be found by referencing the cache database 1 in the cache database server. Since the cache database cluster according to the present invention frequently updates data to be stored in each cache database but does not frequently change the ranges of data to be cached, the table may be updated at the time of a cache database reorganization process described later.

Figure 2:
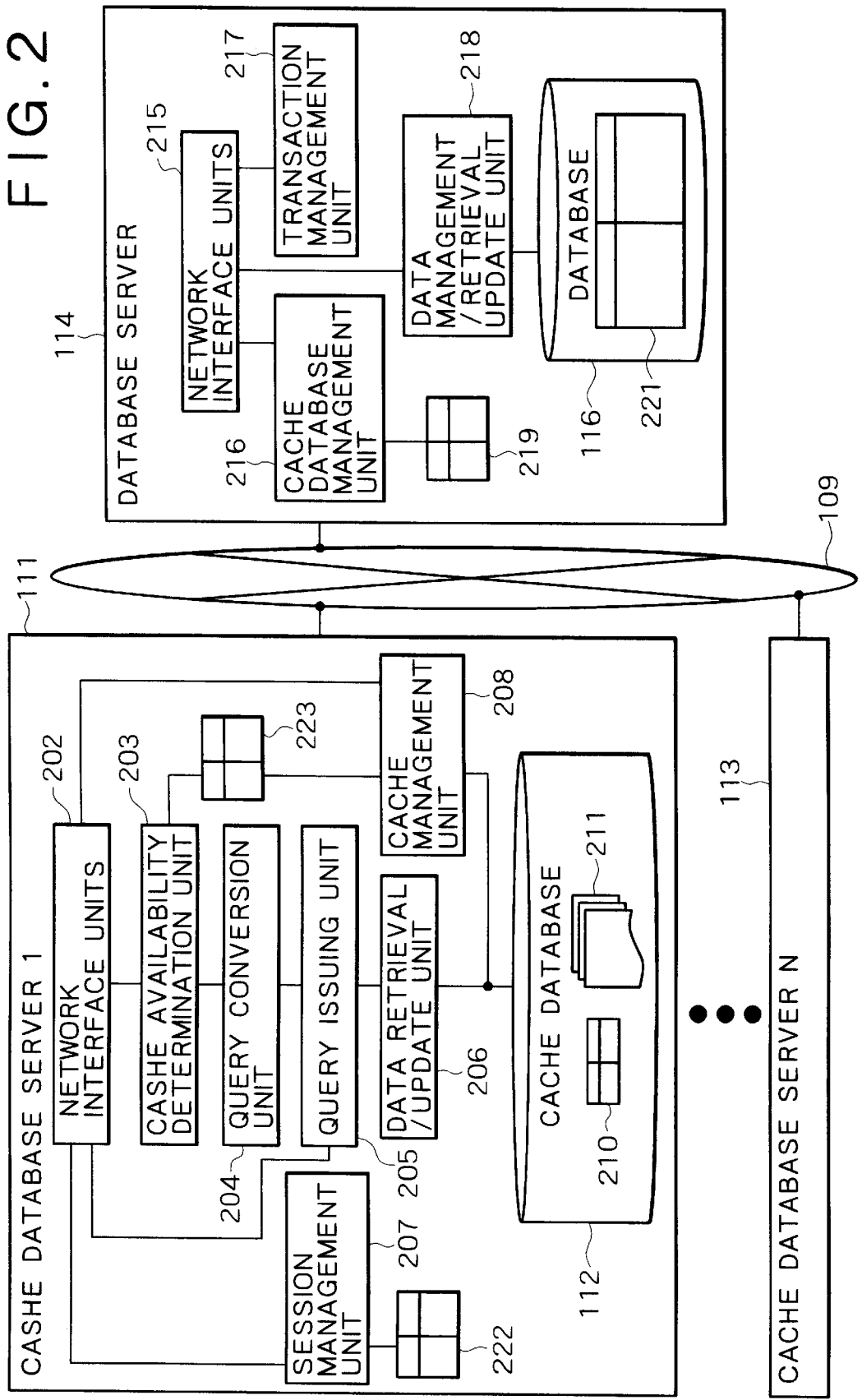
FIG. 2 is a drawing showing the structure of the database server and cache database server.
Figure 3:
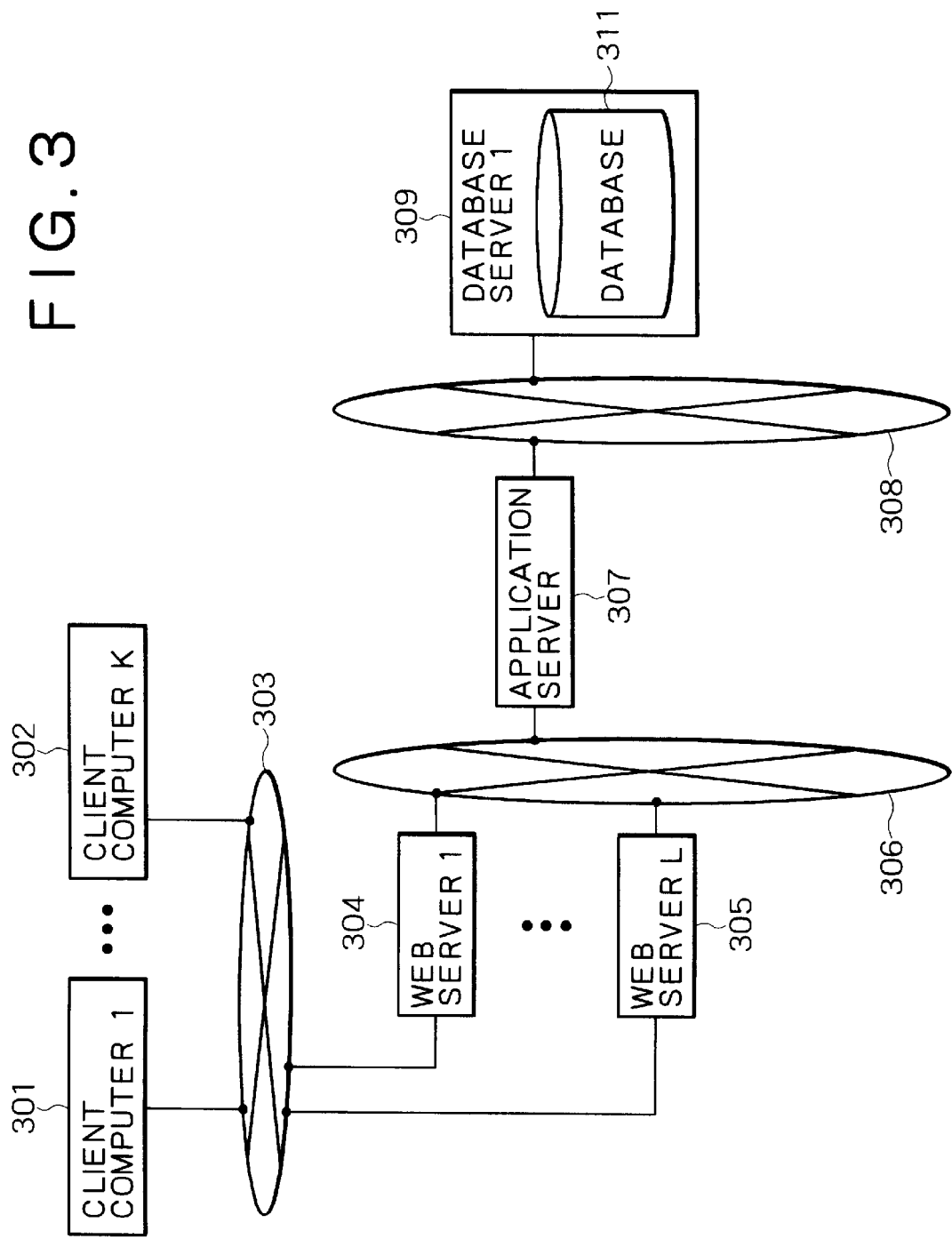
FIG. 3 is a drawing showing the structure of a standard Web system according to the prior art.

A series of query processing steps in the cache database server after a cache database to access is determined will be described with reference to the flowcharts shown in FIGS. 2 and 4. The following example assumes that the application has selected the cache database 1 (112) as a cache database to access. A query transferred from the application server is transmitted to a cache availability determination unit 203 through a network interface unit 202 of the cache database server 1 (111). The cache availability determination unit 202 uses a stored data management table 223 to search the cache database for the desired data. FIG. 5 shows an example of the stored data management tale 223. The exemplary stored data management table 223 stores information about cached data that is managed by the cache database 1 (112). In this table, the entries of database server name 502 and database name 503 columns represent the names of database servers and the names of databases therein for caching respectively; the entries of a table name & attribute name 504 column represent the names of tables for caching and the names of the attributes; the entries of a partition key 505 column represent partition keys used for storing the table separately among cache database clusters; the entries of a caching target data conditions 506 column represent the conditions of data to be cached; the entries of a cached data conditions 507 column represent the range of data that satisfies the caching target data conditions and has actually been cached in the cache database 1 (112); the entries of a refresh policy 508 column represent replacement policies in refreshing cached data; and the entries of an updatability 509 column represent the updatability of cached data on the cache database 1 (112). The record on the first line of the exemplary stored data management table 203, for example, indicates that the data to be cached in the cache database 1 (112) is a record that has four attributes c_id, c_name, c_address, and c_phone in the Customer database of the database server 1 (112) and satisfies the condition 1<=c_id<100000, or that, among records to be cached, records satisfying the condition 1<=c_id<50000 have actually been cached, that the policy for refreshing the cached data is LRU, and that the cached data is updatable on the cache database 1 (112). Although the stored data management table 223 indicates cached data conditions by designating the ranges, it can also be designated with a bitmap indicating stored data.

Returning to FIG. 4, if the desired data exists in the cache database (if 'Yes' is selected in step 402) a query that has been issued for the database server from the application is converted to a query referencing data in the cache database (step 403). Whether the data existing in the cache database can be used to perform processing on which the query is issued can be decided by comparing the query to the cached data conditions. The decisions can be made by checking the equivalence and containment relationships between the applicable conditions by a method such as that referred to as 'Query Equivalence, Query Containment', which has been disclosed in Chapter 14 "Optimization for Conjunctive Queries" in PRINCIPLES OF DATABASE AND KNOWLEDGE-BASE SYSTEMS, volume II, written by Jeffrey D. Ullman, published by COMPUTER SCIENCE PRESS, ISBN 0-7167-8162-X. This method can be used to determine the relationships between a cached data condition and a query condition, and if the cached data condition contains or is equivalent to the query condition, it can be determined that the query can be processed using the data in the cache database. If the query is only about referencing processing (if 'No' is selected in step 404), the application server obtains the query-result from the cache database, then returns it to the application (step 405), and terminates the query processing (step 406). A query conversion unit 204 executes conversion of a query, a query issuing unit 205 issues a query about data in a cache database, a data retrieval and update unit 206 obtains the query-result and values by retrieving cached data 210 in the cache database 1 (112) in response to the query issued by the query issuing unit 205.

If the query is about update, deletion, or addition processing (equivalent to UPDATE, DELETE, and INSERT of the standard database query language SQL) of data (if 'Yes' is selected in step 404), the application server performs cache database update processing (step 407), and returns the status of the update-result to the application (step 408), then terminates the query processing in the cache database server (step 406).

Figure 7:
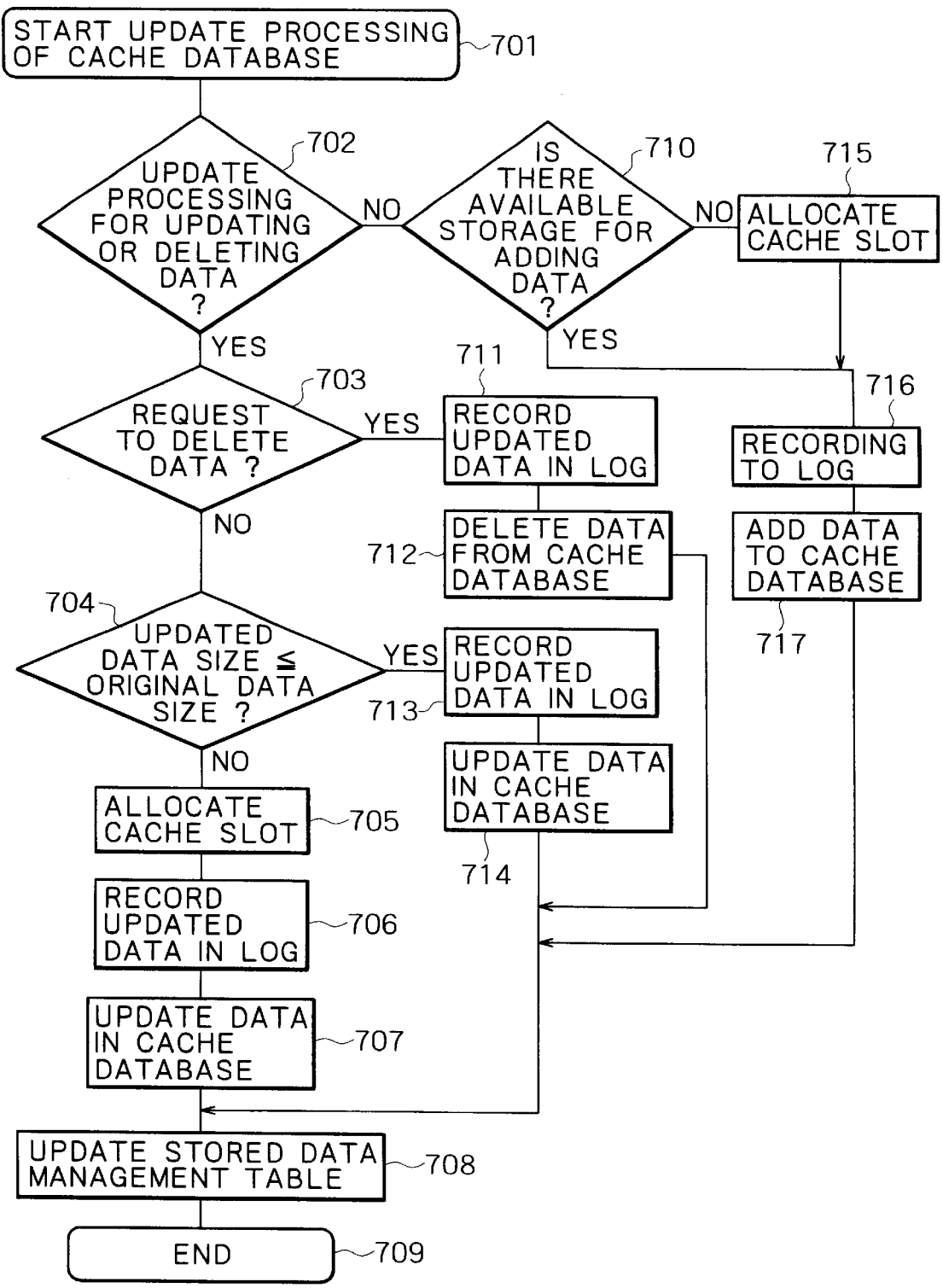
FIG. 7 is a flowchart showing a series of update processing steps of the cache databases.

The cache database update processing will be described with reference to FIG. 7. As described above, the present invention assumes the cache database update processing is for updating, deleting, or adding data. If the update processing is for updating data (if 'Yes' is selected in step 702 and 'No' is selected in step 703), the Web server determines if the updated data size will be equal to or smaller than that of the original data (step 704). If the updated data size will be equal to or smaller than the original data size (if 'Yes' is selected in step 704), the values after the update processing can be stored in the cache database, so the updated information is recorded in a cache database log 211 (just referred to as a log in FIGS. 7 and 8) (step 713), the data in the cache database is updated (step 714), and if there is an entry in the cached data conditions 507 column in the stored data management table 223 shown in FIG. 5, its value is updated (step 708), and the cache database update processing is terminated (step 709). The cache database log 211 having a record of the updated information is retained in the cache database 112 shown in FIG. 2 and manages the entire update history of the cache database. The cache database log management system can be implemented, for example, by using a general-purpose DBMS product such as Hitachi's HiRDB.

Returning to step 704, if the updated data size will be larger than the original data size (if 'No' is selected in step 704), the application server performs a cache slot allocation process (step 705), records the updated information in the cache database log 211 (step 706), updates the data in the cache database (step 707), and if there is an entry in the cached data condition 507 column in the stored data management table 223, updates the value (step 708), and terminates the cache database update processing (step 709). The cache slot allocation processing will be described later.

If the update processing is for deleting data (if 'Yes' is selected in both of steps 702 and 703), the application server records the updated information in the cache database log 211 (step 711), deletes the applicable data from the cache database (step 712), and if there is an entry in the cached data conditions 507 column in the stored data management table 223, updates the value (step 708), terminates the cache database update processing (step 709).

If the update processing is for adding data (if 'No' is selected in step 702), the application server checks on the available storage for adding data (step 710). If there is available storage for adding data (if 'Yes' is selected in step 710), the application server records the updated information in the cache database log 211 (step 716), adds data to the cache database 1 (112) (step 717), and if there is an entry in the cached data condition 507 column in the stored data management table 223, updates the value (step 708), and terminates the cache database update processing (step 709). If there is no available storage for adding data (if 'No' is selected in step 710), the application server performs cache slot allocation processing (step 715), records the updated information in the cache database log 211 (step 716), adds data to the cache database 1 (211) (step 717), and terminates the cache database update processing (step 709).

Figure 8:
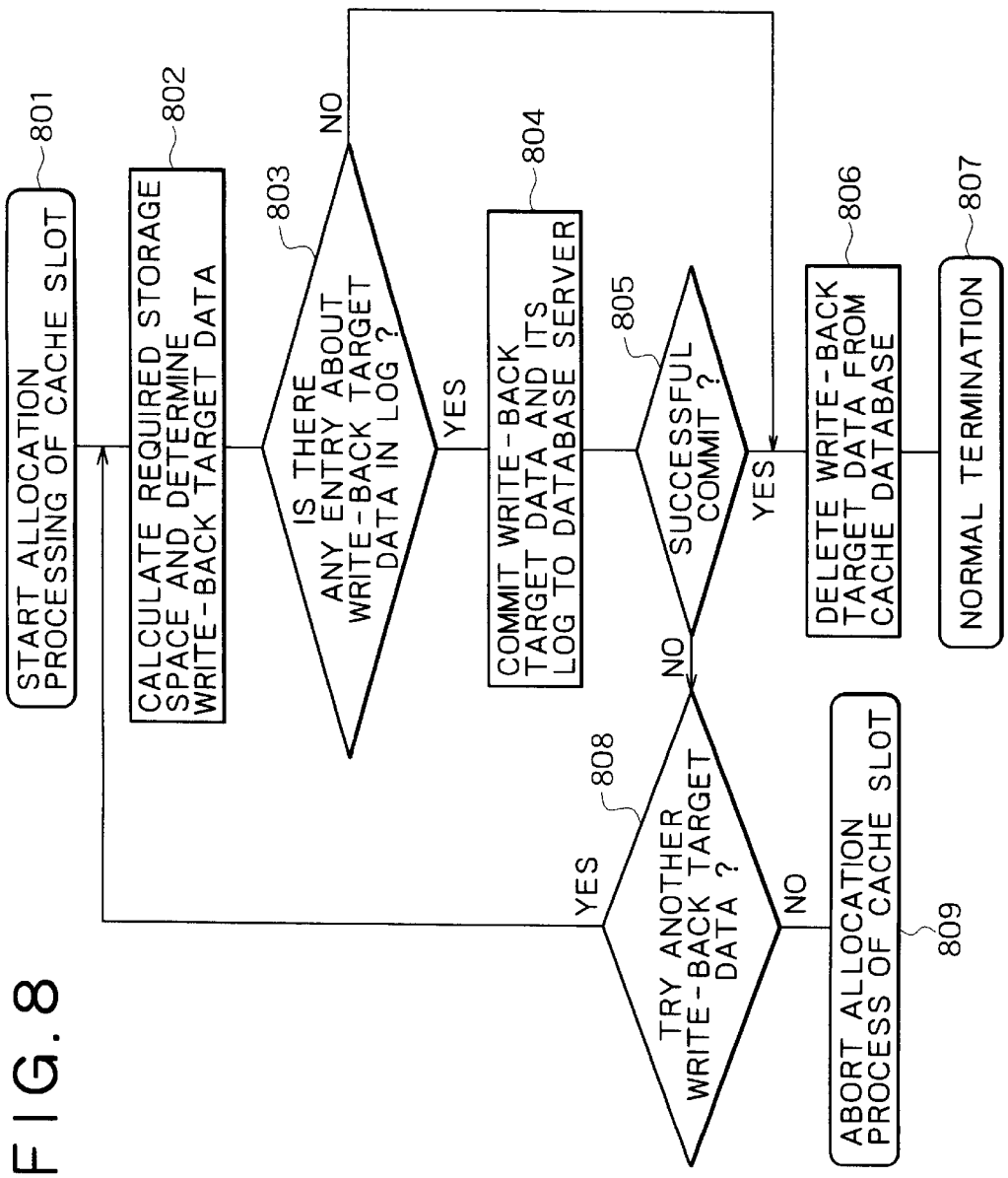
FIG. 8 is a flowchart showing a series of cache-slot allocation processing steps of the cache databases.

The cache slot allocation process will be described with reference to FIG. 8. The cache-slot allocation processing creates storage in the cache database if there is no adequate available storage for caching new data. First the size of storage required to cache the new data is calculated, and data to be deleted (referred to as write-back data) among present cached data is determined (step 802). A cache management unit 208 uses the stored data management table 223 shown in FIG. 2 to carry out the determination. A method of determining write-back data will be described by using the exemplary stored data management table 223 in FIG. 5. The exemplary stored data management table 223 has entries in the refresh policy 508 column. Determining write-back data is carried out according to the entries. Suppose one record needs to be deleted from cached data in the table c__address, for example, since the entry of the refreshing policy 508 column is LRU, data with the earliest referenced date among cached data is selected as data to be deleted.

After the write-back data is determined, the application server checks for an entry regarding the write-back data in the cache database log 211 (step 803). If there is the entry in the cache database log 211, this means that the write-back data has been updated on the cache database, so the update must be reflected on the database server to delete the write-back data from the cache database. Therefore, if there is an entry in the cache database log 211 (if 'Yes' is selected in step 803), the Web server commits the write-back data and the cache database log regarding the data to the database server (step 804). To reduce the cost of determining the presence or absence of changes in write-back data by analyzing the cache database log 211, one possible embodiment provides a bitmap for determining the presence or absence of record update, and only if update is found by checking the bitmap, the cache database log is analyzed.

Returning to FIG. 8, if the commit is completed successfully (if 'Yes' is selected in step 805), the application server deletes the write-back data from the cache database (step 806), and terminates the cache slot allocation process (step 807). If the commit to the database server is failed (if 'No' is selected in step 805), the application server determines whether to retry the process by selecting another data as write-back data (step 808). For retrying the process (if 'Yes' is selected in step 808), the application server returns to step 802 and repeats the series of steps described above. If the application server does not retry the process (if 'No' is selected in step 808), it aborts the cache slot allocation processing (step 809).

Figure 4:
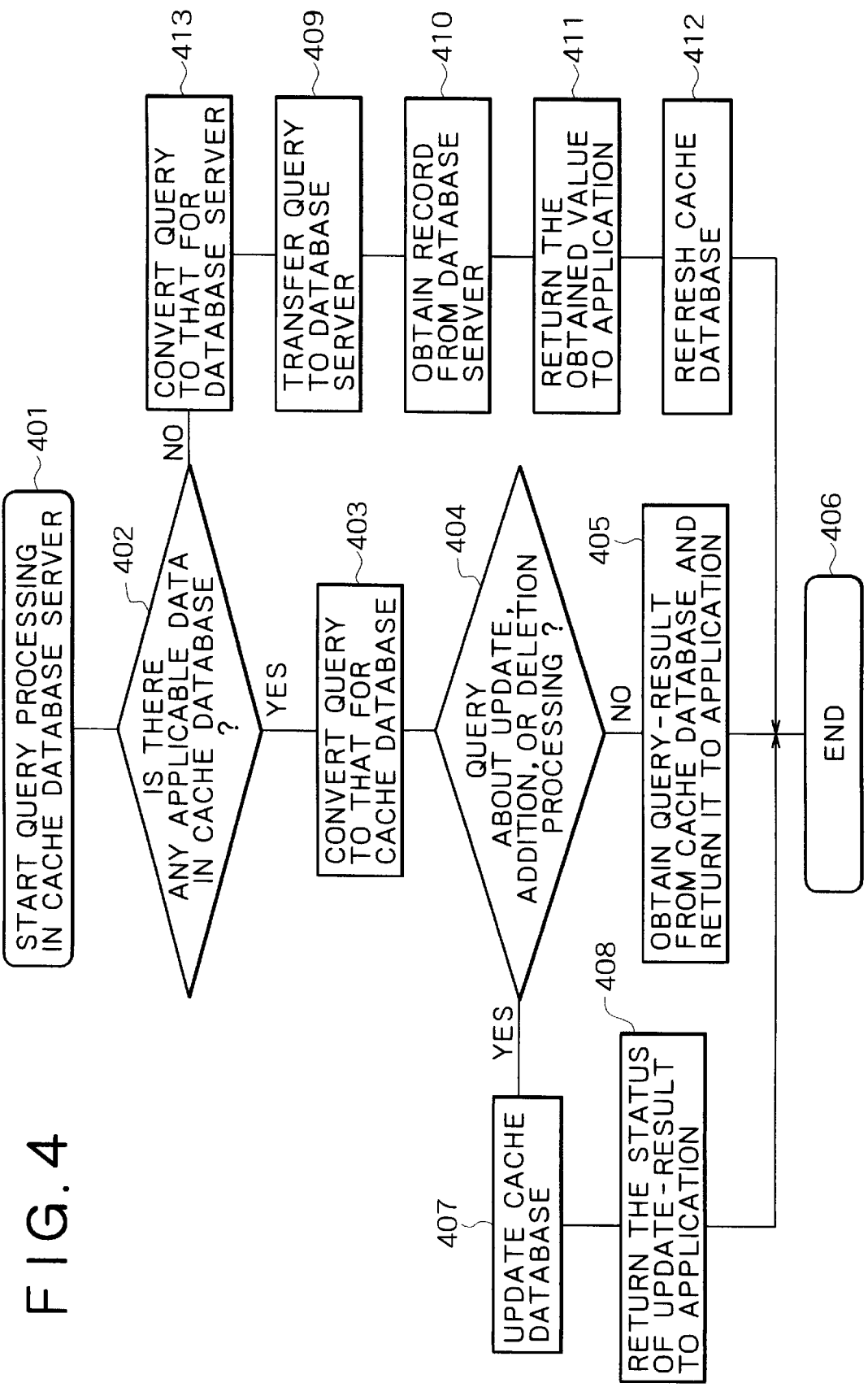
FIG. 4 is a flowchart showing a series of query processing steps in the cache database server.

Again returning to step 402 of the query processing shown in FIG. 4 in the cache database server, if no applicable data is found in the cache database server (if 'No' is selected in step 402), the query is converted to the one for the database server (step 413), the converted query is transferred to the database server (step 409), the query-result from the database server is obtained (step 410), and the obtained value is returned to the application (step 411). The query conversion processing and query transfer processing are performed in the query conversion unit 204 and the query issuing unit 205 respectively, and through the network interface unit 202. An example of the processing of converting a query to that for database server in step 413 will now be described with reference to the stored data management table 223 shown in FIG. 5. Suppose a query indicated by an expression 1801 shown in FIG. 18 is issued from an application to the cache database 1 (112). This query intends to retrieve customer name (c__name) whose customer ID (c__id) is 60000. As indicated by the entry in the cached data conditions 507 column of the record on the first line in FIG. 5, the cache database 1 does not retain the customer name, so the query must be transferred to the database server 1 (114). The database server 1 (114) accepts the transferred query at a network interface unit 215, a data management/retrieval/update unit 218 searches the database 116 to retrieve a record that satisfies the query conditions from original data 221 stored therein and returns the record to the cache database server.

If the query indicated by the expression 1801 is transferred as is to the database server 1 (114) to obtain the result, however, the obtained result contains only c__name and does not contain other three attributes (c__id, c__address, and c__phone) necessary as the entries of the table name & attribute name 504 column in FIG. 5, which indicates a table in which the record is cached and the names of the attributes, so the result cannot be cached. Therefore, before being transferred, the query indicated by the expression 1801 is converted to a form indicated by an expression 1802 that includes the other attributes necessary for the caching.

Figure 6:
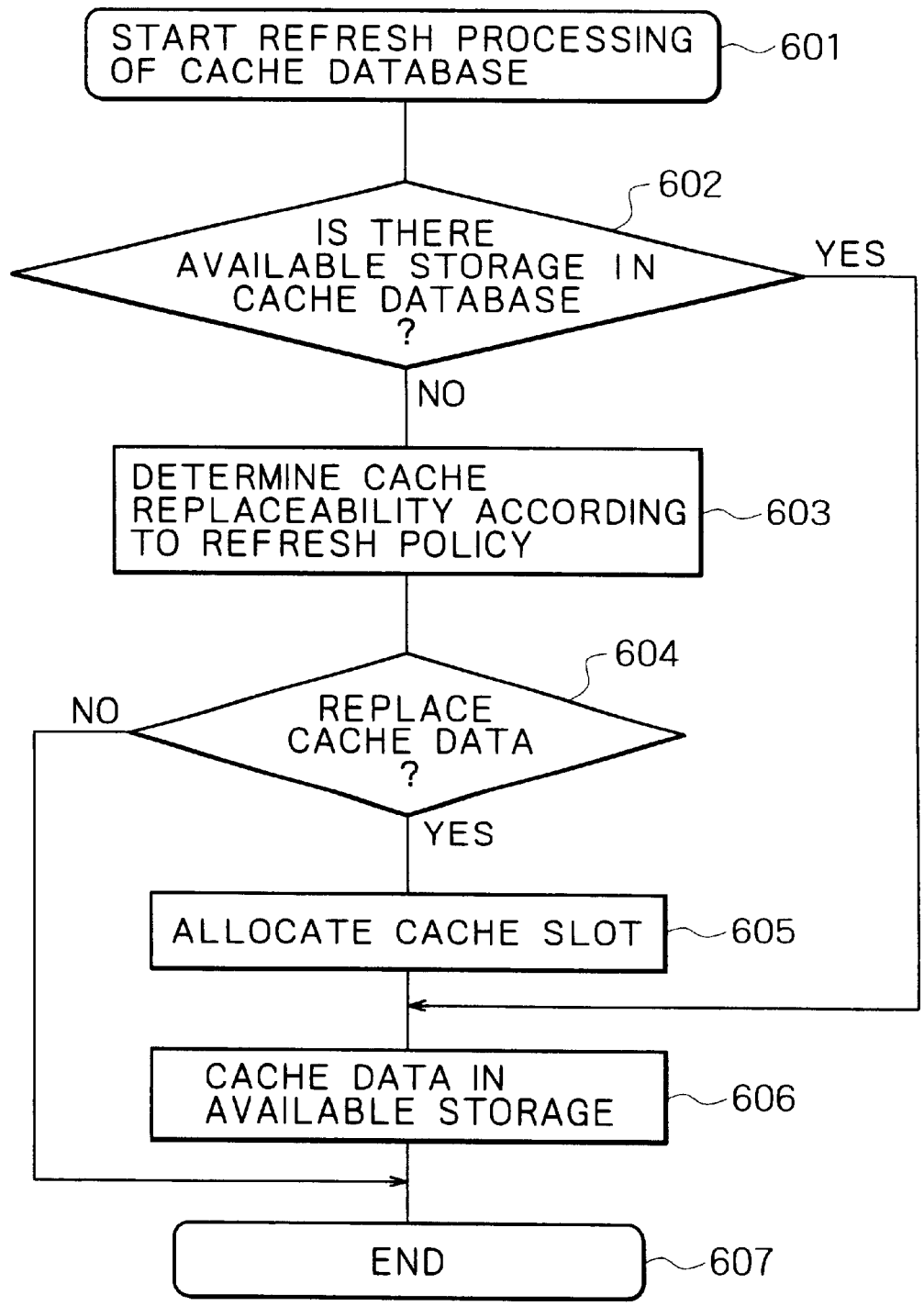
FIG. 6 is a flowchart showing a series of refresh processing steps of the cache databases.

The query process performs a cache database refresh processing using a record obtained by the converted query (step 412) and is ended (step 406). The refresh processing causes a record obtained as a query-result to be reflected to the cache database as required. The cache database refresh processing will be described with reference to the flowchart shown in FIG. 6. First whether there is available storage in the cache database for storing data newly obtained from the database server or not is determined (step 602). If there is available storage (if 'Yes' is selected in step 602), the data is cached in the available storage (step 606), and the cache database refresh processing is terminated (step 607). If there is no available storage in the cache database (if 'No' is selected in step 602), decision on replacability of data newly obtained from the database server and data in the cache database is made according to the refresh policy (step 603). The refresh policy designates a policy for replacing cache, as indicated by the refresh policy 508 column in the stored data management table 223 shown in FIG. 5, including (1) LRU that causes data with the earliest usage date to be replaced, (2) frequency of use that causes data with lower frequency of use in the cache to be replaced, (3) priority designation that determines data to be replaced based on user-defined priorities assigned to data in the cache, and (4) write-back data deletion that causes data that need not write-back processing in the database server to be replaced. If a result of the decision on the replaceability according to the applicable refresh policy shows the necessity for the cached data to be replaced with data obtained from the database server (if 'Yes' is selected in step 604); the cache-slot allocation processing is performed (step 605); the data is cached in the available storage (step 606); and the cache database refresh processing is terminated (step 607). If a result of the decision on the replaceability according to the applicable refresh policy does not show the necessity for the cache data to be replaced with data obtained from the database server (if 'No' is selected in step 604), the cache database refresh processing is terminated without replacing cache (step 607).

Up to this point, the query processing method using a cache database cluster has been described. This embodiment uses the entries of the cached data conditions 507 column in FIG. 5 to determine whether a query is processed with cached data or not. Another embodiment is also possible for some types of applications, which uses the entries of the caching target data conditions 506 column instead for the determination, and if no values can be obtained as a result of actual cache database search, then a query is newly issued to the database server. This embodiment has a merit of reducing the cost for maintaining the cached data conditions.

Figure 9:
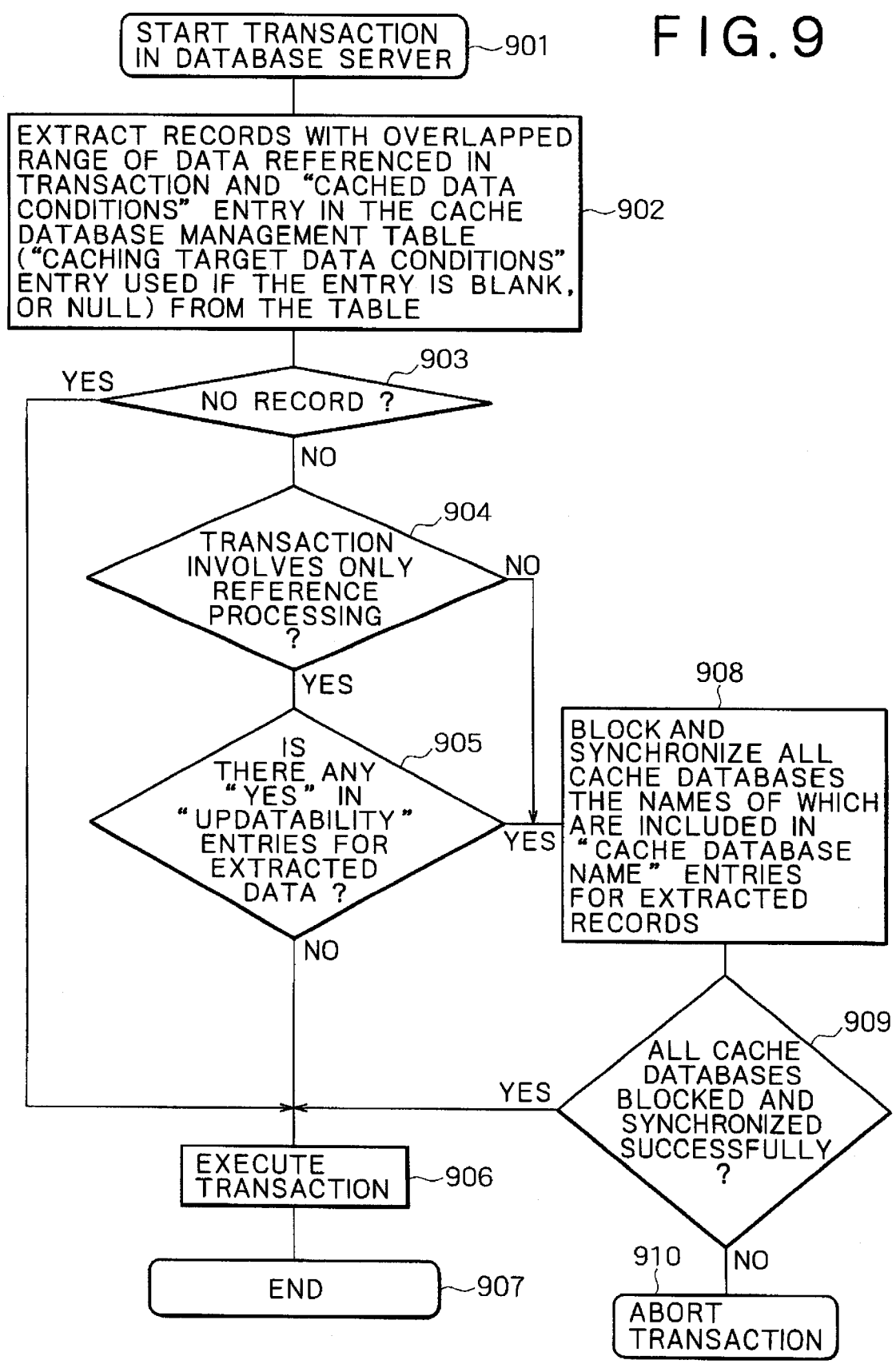
FIG. 9 is a flowchart showing a series of transaction processing steps of the database servers.

Next, a transaction processing method on the database server side will be described with reference to the flowchart in FIG. 9. The transaction processing is performed by a transaction management unit 217 in the database server 1 (114) shown in FIG. 2, using information in a cache database management table 219 held by a cache database management unit 216. FIG. 10 shows an exemplary cache database management table 219. The exemplary cache database management table 219 includes columns of cache database server name 1002, database name in database server 1003, table name & attribute name 1004, partition key 1005, caching target data conditions 1006, cached data conditions 1007, updatability 1008, and operating state 1009. The description on these columns will be given by using a record on the first line of the table as an example. The record indicates that attributes c_id, c_name, c_address, and c_phone of the table c_address contained in the database Customer in the database server are cached in the cache database 1 in the cache database server 1; if the record satisfies the condition 1<=c_id<100000 presently the record that satisfies the condition 1<=c_id<50000 is actually cached; the cache database 1 is in operation; and the cache is updatable. The cached data conditions may be designated either by designating the range as indicated by the applicable entries of the records #1 and #2 in FIG. 10 or by designating a bitmap retaining the cached record ID as indicated by the applicable entry of the record #3. It is also possible for the cached data condition to be unrecorded on the database server side and the entry to be remained blank, or Null. In this case, the present invention performs the determination processing regarding the cached data condition by replacing it with caching data condition. This causes the database server side to recognize that there is more data items than data items that have actually been cached on the cache database side, reducing the number of opportunities enabling the transaction process to be performed, while it has a merit of eliminating the necessity of updating the cache database management table 219 every time the cache is updated.

Again referring to FIG. 9, a record having an overlapped portion between the range of data to be referenced by transaction and the range indicated by the applicable entry of the cached data conditions 1007 column in the cache database management table 219 is extracted from the cache database management table 219 (step 902). Suppose the cache database management table is as is in FIG. 10, for example, and a transaction is "to change the phone number of a customer with customer ID 10". At this time, the transaction references and updates the record of c_id=10 in the c_address table. In this case, a cache database server that overlaps the transaction is the cache database server 1.

Next, the record extracted as a result of step 902 is checked (step 903). If there is no extracted data (if 'Yes' is selected in step 903), the cache of a table to be referenced or updated by the transaction of the server does not exist in any cache database, so the transaction is executed (step 906), and is terminated (step 907). If there is a record extracted as a result of step 902 (if 'No' is selected in step 903), whether the transaction includes only reference processing or not (step 904) and whether there is an entry of 'Yes' in the updatability 1008 column or not (step 905) are determined. If the transaction includes only reference processing and all the entries in the updatability 1008 column for the extracted records indicate 'No' (if 'Yes' is selected in step 904 and 'No' is selected in step 905), it is assured that data to be referenced by the transaction has not been updated on the cache database side, so the transaction is performed (step 906), and then terminated (step 907).

If the transaction includes update processing or there is an entry of 'Yes' in the updatability 1008 column for the extracted records (if 'No' is selected in step 904 or 'Yes's are selected in both of steps 904 and 905), a mismatch due to an event that data cached on the cache database is updated on the database server or that update on the cache database server is ignored on the database server might occur. To avoid such mismatches, the blocking synchronization processing for the cache database the name of which is included in the entry of the cache database name 1010 column for the extracted record (step 908), and if the blocking synchronization processing is completed successfully (if 'Yes' is selected in step 909), the transaction is performed (step 906), and terminated (step 907). If the blocking synchronization processing is failed (if 'No' is selected in step 909), the transaction is aborted (step 910).

Figure 11:
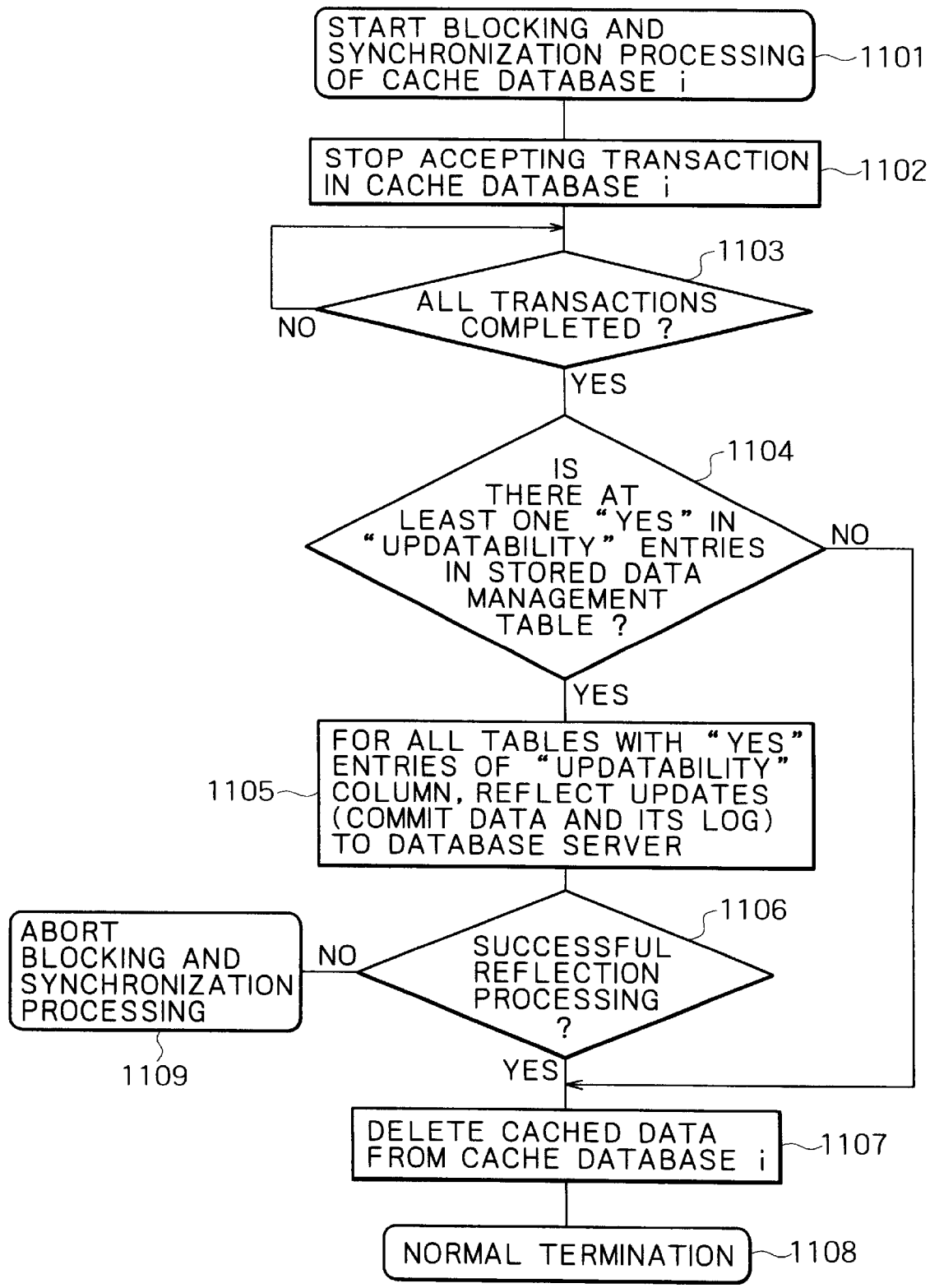
FIG. 11 is a flowchart showing a series of blocking and synchronization processing steps of the cache databases.

The blocking synchronization processing of the cache database will be described with reference to the flowchart shown in FIG. 11. The blocking synchronization processing at the ith cache database i regarding the database server j will now be described. It should be noted that the flowchart in FIG. 11 omits the phrase "regarding the database server j" for convenience of space. First the cache database i stops the acceptance of a transaction to access cached data in the database server j (referred to as a transaction regarding the database server j below) (step 1102). After all transactions on the database server j are completed (if 'Yes' is selected in step 1103), whether the entry in the database name in database server 1003 column in the stored data management table in the cache database indicates the database server j and whether there is at least one 'Yes' in the entries of the updatability 1008 column or not are checked. If there is no 'Yes' entry (if 'No' is selected in step 1104), the update processing regarding the database server j is not performed in the cache database i, so data regarding the database server j in the cache database is deleted (step 1107) and the blocking synchronization processing is terminated (step 1108). If there is at least one 'Yes' in the entries of the updatability 1008 column (if 'Yes' is selected in step 1104) updates of all the tables with 'Yes' in the entries of the updatability 1008 column on the cache database are reflected on the database server j. The reflection processing is performed regarding not only data images after updated but also the cache database log providing update history (step 1105). If the reflection processing is completed successfully (if 'Yes' is selected in step 1106), data regarding the database server j in the cache database is deleted (step 1107), and the blocking synchronization processing is terminated (step 1108). If the reflection processing is failed (if 'No' is selected in step 1106), the blocking synchronization processing is aborted (step 1109). Although this embodiment stops only the transaction regarding the database server j, if transactions cannot be stopped selectively, all transactions must be stopped in the cache database i. This causes a limitation that cached data in the database servers other than the database server j becomes unavailable temporarily, but needless to say, this embodiment is applicable.

The transaction processing method in the database server has been described above.

Finally, a cache database addition processing method will be described.

Figure 13:
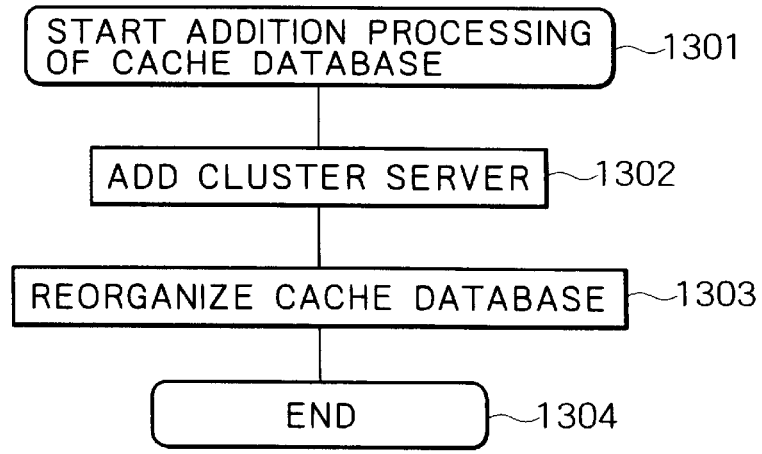
FIG. 13 is a flowchart showing a series of cache database addition processing steps.

A new server can be added to a cache database cluster by adding the server to the cluster (step 1302) as shown in FIG. 13, and executing a cache database reorganization processing (step 1303).

Figure 12:
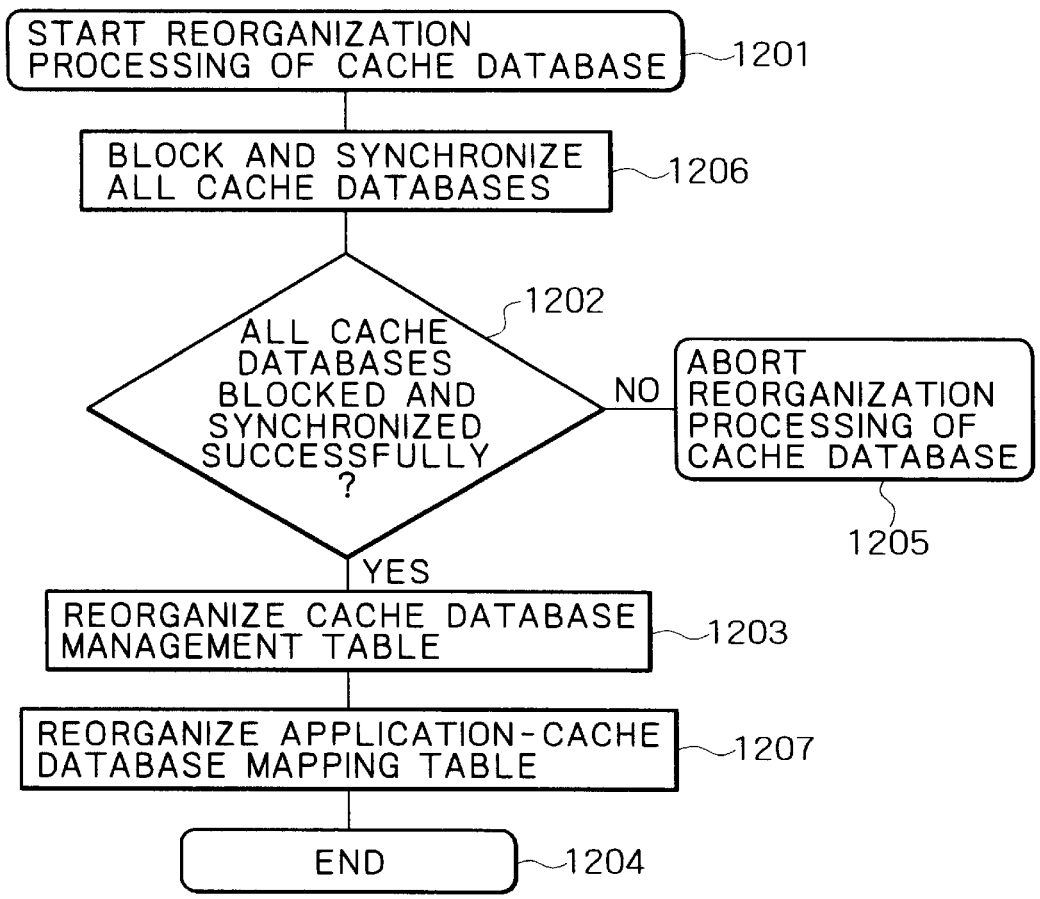
FIG. 12 is a flowchart showing a series of cache database reorganization processing steps.

The cache database reorganization processing will be described with reference to the flowchart shown in FIG. 12. First blocking synchronization processing is performed for all of the cache databases (step 1206). If the blocking synchronization processing is failed (if 'No' is selected in step 1202), the cache database reorganization processing is aborted (step 1205). If the blocking synchronization processing is completed successfully (if 'Yes' is selected in step 1202), the cache database management table and the application-cache database mapping table are reconstructed (steps 1203 and 1207), and the cache database reorganization processing is terminated (step 1204).

What is claimed is:

1. A Web system comprising:
   at least one Web server computer system (referred to as a Web server below) that is connected to at least one client computer system through a network, accepts a request from the client computer system, obtains the result by performing the applicable processing in the system or by transferring the processing to another computer system, and returns the result to the client computer;
   at least one application server computer system (referred to as an application server below) that is connected to the Web server through a network and executes an application for processing a request transferred from the Web server;
   at least one database server computer (referred to as a database server below) that is connected to the application server through a network and includes a database that manages data required by the application to process a request and references or updates the data in response to requests from the application;
   a cache database cluster that is connected to the application server and the database server through respective different networks and has functions of caching part of data in the database server, processing requests that can be processed in its own system among requests transferred from the application server to the database server, and transferring requests that cannot be processed in its own system to the database server; and
   the cache database cluster including at least one cache database server computer (referred to as a cache database server below) provided with cache databases.

2. The Web system of claim 1, wherein the application server comprises
   a means for storing a session state of an application into the cache database or the database, and
   a means for reading the stored session state therefrom and continuing the session of the application.

3. The Web system of claim 2, wherein the application server comprises, if there are a plurality of cache databases or databases in which session states can be stored and from which session states can be read, a means for determining a cache database or a database into which the session state is stored or from which the session state is read with a session ID that is a unique value given to each logical session in the Web system.

4. The Web system of claim 1, wherein the application server retains mapping data including the name of an application or an ID for identifying the application, the name of a database table retaining data used by the application, the name of a cache data server that may have cached data or an ID for identifying the cache database server, and the name of a cache database in the cache database, and has a mechanism of determining a cache database to access by referencing the mapping data.

5. The Web system of claim 1, wherein the cache database server has a stored data management table retaining:
   (1) a format of data to be cached in a cache database in its own system, and
   (2) a condition for identifying data that has actually been cached in the cache database, or both of the condition and a condition that identifies caching target data.

6. The Web system of claim 5, wherein:
   the stored data management table has a column for designating the updatability of data on cache databases;
   the cache database server further has a mechanism of determining the updatability of data on the cache database according to a designated value in the column.

7. The Web system of claim 6, wherein the cache database server includes:
   a query conversion unit that compares a first condition that identifies data actually being cached in the cache database with a second condition in a query transferred from an application and converts the query to the one to be processed with data in the cache database;
   a query issuing unit that issues the converted query to the cache database;
   a data retrieval and update unit that accepts the issued query and retrieves and updates data in the cache database;
   the query conversion unit, if the first condition does not contain the second condition, further comprising a mechanism of converting a query transferred from the application to a query for obtaining all necessary data in a format designated for caching in the stored data management table; and
   the query issuing unit further comprising a mechanism of issuing the converted query to the database server.

8. The Web system of claim 1, wherein the database server comprises:
   a cache database management table that stores (1) data that is managed by its own database, (2) the name of a cache database that caches the data or an ID that identifies the cache database, (3) caching target data conditions that designate the range of data to be cached in the cache database, (4) updatability of cached data in the cache database, and (5) operating state of the cache database; and
   a transaction management unit that performs transaction processing based on data in the cache database management table.

9. The Web system of claim 8, wherein the cache database management table includes:

(1) data that is managed by its own database, (2) the name of a cache database that caches the data or an ID that identifies the cache database, (3) caching target data conditions that designate the range of data to be cached in the cache database, (4) updatability of cached data in the cache database, (5) operating state of the cache database, and also (6) cached data conditions that indicate the range of data that has been cached in the cache database.

10. The Web system of claim 9, wherein the transaction management unit comprises:

comparing a first condition that indicates the range of data referenced by a transaction to be executed in the database server with a second condition that is indicated by an entry of the cached data conditions column in the cache database management table;

executing a transaction without executing the blocking synchronization process of the cache database if there is no overlapped portion between the first condition and the second condition or if the transaction includes only reference processing and all the entries of the updatablility column for records in the cache database management table that has the second condition entries having overlapped portions with the first condition are 'No'; and otherwise executing a transaction after executing the blocking synchronization process of all cache databases the names of which are included in the cache database name column in the cache database management table that has entries of the second conditions having overlapped portions with the first condition if otherwise.

11. The Web system of claim 8, wherein the transaction management unit comprises:

comparing a first condition that indicates the range of data referenced by a transaction to be executed in the database server with a second condition that is indicated by an entry of the caching target data conditions column in the cache database management table;

executing a transaction without executing the blocking synchronization processing of the cache database if there is no overlapped portion between the first condition and the second condition or if the transaction includes only reference processing and all the entries of the updatablility column for records in the cache database management table that has the second condition entries having overlapped portions with the first condition are 'No'; and otherwise executing a transaction after executing the blocking synchronization processing of all cache databases the names of which are included in the cache database name column in the cache database management table that has entries of the second conditions having an overlapped portion with the first condition.

12. A query processing method executed in a cache database server that is connected to at least one application server and at least one database server including a database for managing data required for processing a query by an application on the application server and updating and referencing the data in response to a request from the application and that manages a cache database in which part of data in the database is cached, comprising;

storing the format of data to be cached in the cache database and a first condition that identifies data that has actually been stored in the cache database in a stored data management table;

comparing a second condition contained in a query transferred from the application server with the first condition;

converting the query to a query for being processed using data in the cache database and issuing the converted query to the cache database; and converting the query to a query that requests for required data all in a format designated for caching data in the stored data management table and retransferring the converted query to the database server if the first condition does not contain the second condition.

13. The query processing method of claim 12, further comprising a process of refreshing the cached data with data obtained through retransfer of the query to the database server including:

a step of adding the obtained data to the cache database if there is available storage for storing the obtained data therein; and a step of replacing cached data with the obtained data according to the applicable refresh policy designated in the stored data management table if there is no adequate available storage for storing the obtained data in the cache database.

14. A cache database query processing method in the query processing method of claim 12 further, wherein a cache database update process involved in the processing of a query issued to the cache database comprising steps of:

recording update history of the cache database in a cache database log and updating data only on the cache database if there is adequate available storage for executing the update process on the cache database;

determining data to be deleted from the cache for allocating required storage if there is no adequate available storage on the cache database;

committing the update history of deletion target data and updated data to the server only if the deletion target data has been updated on the cache database;

deleting the deletion target data from the cache database if the commitment process succeeded; and executing the update process by using available storage allocated through the deletion processing of the deletion target data.

15. The cache database query processing method of claim 14, wherein presence and absence of an update of the deletion target data on the cache are determined by the result of retrieving the deletion target data in a cache database log.

* * * * *